Patented Feb. 3, 1931

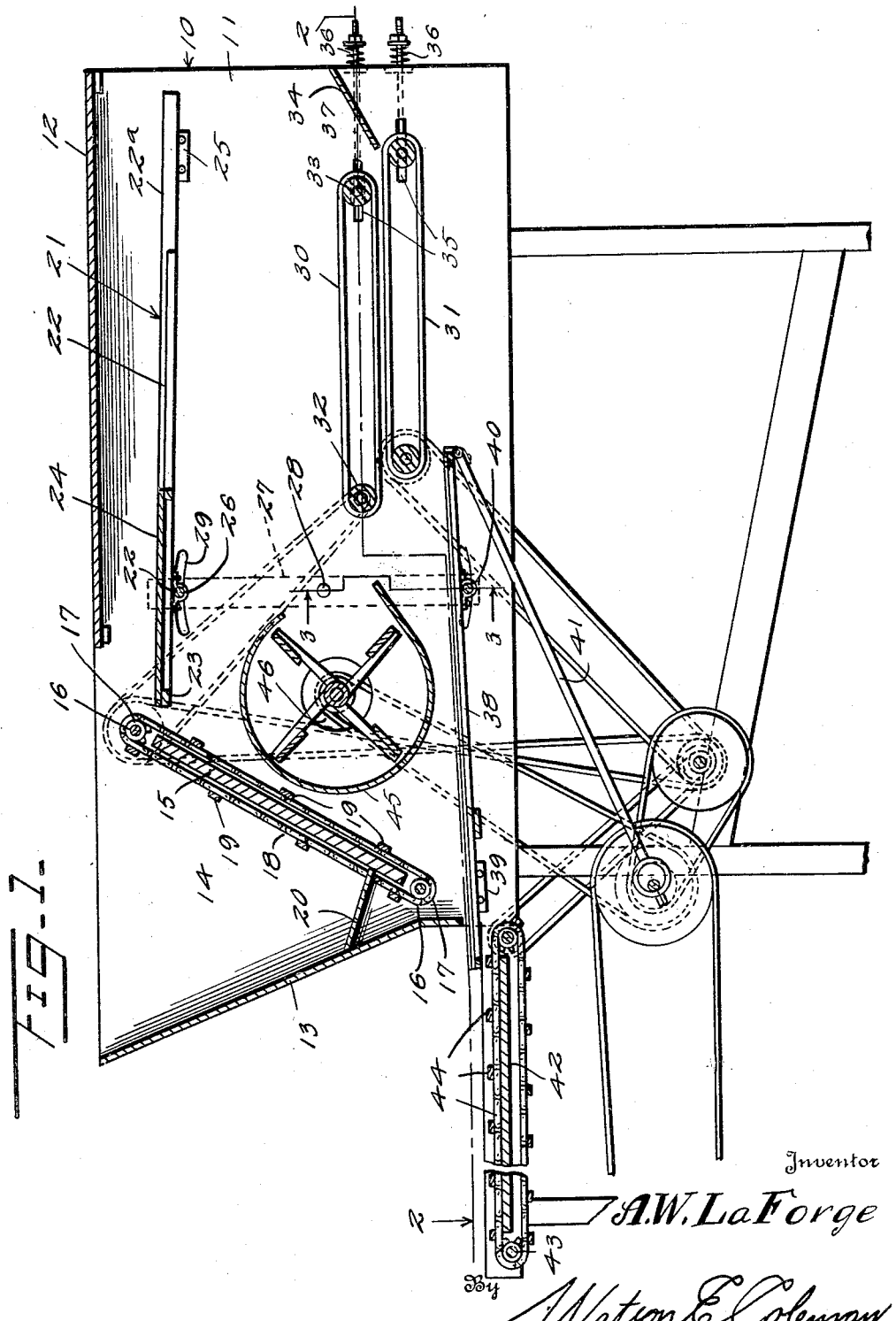

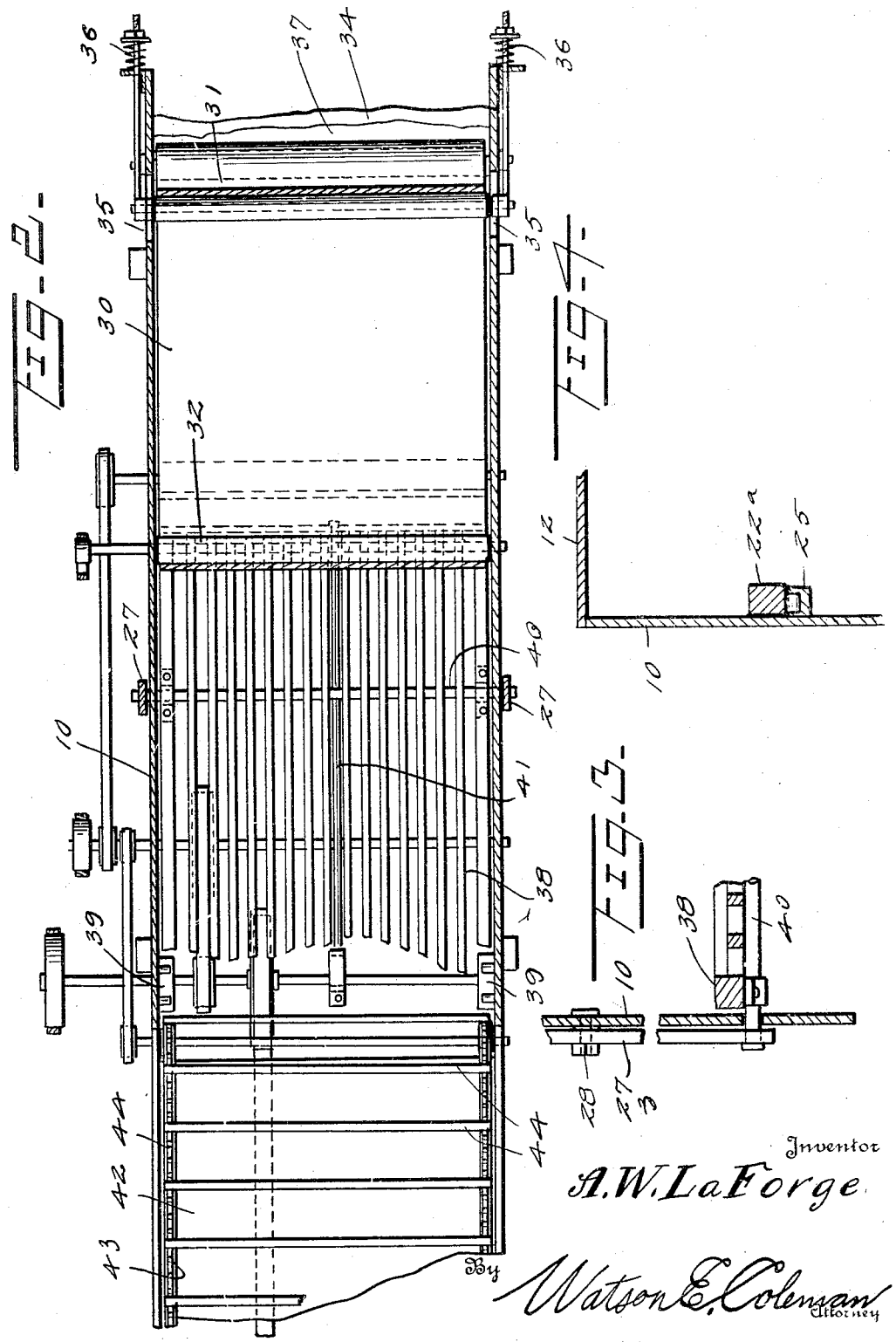

1,791,362

UNITED STATES PATENT OFFICE

ALBERT W. LA FORGE, OF CHINO, CALIFORNIA

WALNUT HARVESTER

Application filed December 27, 1928. Serial No. 328,827.

This invention relates to walnut harvesters, and more particularly to an apparatus for separating walnuts from their hulls and from the débris gathered when such nuts are simply raked into piles beneath the tree from which they have fallen.

An important object of the invention is to provide apparatus of this character in which the hulling and separation is a continuous operation and the removal of débris and hulls from the nuts is thoroughly accomplished.

A further object of the invention is to produce apparatus of this character which may be very readily and cheaply manufactured, which will be durable and efficient in service, and a general improvement in the art.

These and other objects I attain by the construction shown in the accompanying drawings, wherein for the purpose of illustration is shown a preferred embodiment of my invention and wherein:—

Fig. 1 is a longitudinal sectional view partly in detail of the device constructed according to the preferred embodiment of this invention.

Fig. 2 is a sectional view partly in detail taken on the line 2—2 of Fig. 1.

Fig. 3 is a sectional view taken on the line 3—3 of Fig. 1, and

Fig. 4 is a fragmentary sectional view showing the manner in which the first riddle is mounted in the casing.

Referring now more particularly to the drawings, the numeral 10 generally designates a casing comprising side walls 11, a top wall 12 of less length than the side walls extending from one end of these side walls and an end wall 13 connecting the side walls at the end thereof opposite to that from which the top wall 12 extends. The end wall 13 inclines inwardly and downwardly and forms one wall of a V-shaped hopper 14. The opposite wall of this hopper is formed by an upwardly and rearwardly inclining partition 15, the lower end of which is slightly spaced from the front wall and the upper end of which is spaced from the upper edges of the side walls. In alignment with the partition wall and at the upper and lower ends thereof are conveyor shafts 16 bearing sprockets 17 over which pass conveyor chains 18 having spaced flights 19 connecting the same. From the front wall 13, a flexible flap 20 extends rearwardly and downwardly and has its rear edge resting against the partition wall 15. This flap will move upwardly to permit the passage of a flight and after the flight has passed, will drop downwardly, so that it acts as a check valve to prevent the passage of nuts or débris dumped with the nuts into the hopper 14 through the bottom of this hopper.

Extending rearwardly from a point immediately below the upper end of the conveyor toward the open rear end of the machine and inclining downwardly toward such rear end is a riddle, generally designated at 21. This riddle comprises longitudinally extending bars 22 connected at their forward ends by a cross bar 23 and by a plate 24. The side bars 22a are of greater length than the remainder of the bars and rest adjacent their rear ends upon supports 25 projecting inwardly from the side walls 11 of the casing. The forward end of the riddle is supported by a transversely extending shaft 26, the ends of which project through the side walls 11 of the casing and are secured to the upper ends of vertically extending arms 27, which are pivoted to the side walls of the casing at the outer faces thereof, as indicated at 28. The walls 11 are slotted, as at 29, so that the arms 27 may be oscillated and thereby cause the shaft 26 and the riddle 21 to be reciprocated longitudinally of the casing.

Arranged within the rear portion of the casing are upper and lower conveyor belts 30 and 31. The upper conveyor belt 30 has its forward roller 32 arranged slightly forwardly of the rear edge of the plate 24 and the rear roller 33 thereof in spaced relation to the rear end of the casing but rearwardly of the rear ends of the shorter bars 22 of the riddle 21. The conveyor belt 31, which is preferably of the same length as the conveyor belt 30, is offset rearwardly therefrom, so that the rear end of this conveyor belt is exposed rearwardly of the conveyor belt 30.

Inclining upwardly and rearwardly from the conveyor belt 31 and supported by the side walls 11 is a baffle plate 34. The rear rollers of both the belts 30 and 31 are capable of limited longitudinal movement, having their axles projecting through slots 35 formed in the side walls. These axles are connected with tensioning devices 36 permitting movement of the rollers to compensate for variation in the quantity of materials passing therebetween. It will be noted that the rear ends of these conveyor belts and plate 34 combine to produce a hopper 37 for the reception of nuts.

Arranged within the bottom of the casing at the forward portion thereof is a forwardly and downwardly inclining riddle 38 comprising spaced longitudinally extending bars. The rear end of this riddle extends rearwardly of the forward end of the belt 31 and the forward end thereof projects beneath the lower end of the front wall 13, for a purpose presently to appear. This riddle has its forward end supported by guide blocks 39 secured to the side walls 11 and its rear end carried by a transversely extending shaft 40, which projects through slots formed in the side walls and is secured to the lower ends of the arms 27. Suitable means are provided for shifting this last named riddle longitudinally, these means being at present indicated as an eccentrically operated pitman 41 connected to the rear end of the riddle. The forward end of the riddle 38 discharges upon a table 42 over which operates the upper run of a conveyor 43 having spaced flights 44 moving materials discharged upon the upper surface of the table longitudinally thereof for discharge from the far or forward end into suitable receptacles.

Within the casing immediately rearwardly of the partition wall 15 is arranged a transversely extending blower casing 45, the end walls of which are formed by the side walls 11 of the casing and are provided with intake apertures 46. The outlet or discharge opening of the casing is rearwardly directed and provides a forced draft toward the open rear end of the casing. Suitable driving connections are provided for the conveyor belts 18, 43 and 30 and 31, care being taken that in driving the last named conveyors, one of these conveyors, preferably the upper, is driven at a higher rate of speed than the other, the preferred ratio being about six to one.

In the use of the device, the nuts intermingled with débris, as they are when simply gathered by the means of a rake beneath the tree from which they have fallen, are dumped into the hopper 14 and are carried by the flights from the upper end of this hopper and deposited upon the plate 24 which forms the forward end of the riddle 21. By agitation of this riddle they are caused to pass rearwardly, the nuts falling between the bars 22 upon the upper conveyor 30, which is moving in the direction of the arrow of Figure 1.

As the nuts fall, they are acted upon by the blast of air which tends to remove all light foreign matter and blow it from the rear end of the machine. The nuts which fall upon the belt 30 will be carried rearwardly thereby and deposited in the hopper 37 from which they will pass between the conveyor belts 30 and 31. Since these belts are traveling at different rates of speed, the nuts, during their passage between these belts, will be rolled over and over, causing a complete separation of the hulls from the nuts. It will be further noted that twice in their passage, they will be crushed between the unyielding surface of a roller and the clamping surface of the opposed belt, with the result that the removal of the hulls will be expedited.

As they are discharged from the forward end of the belt 31, they fall upon the riddle 38 and the agitation of this riddle completes the separation of the nuts from the hulls and permits the crushed and disintegrated hulls to fall through the bars of the riddle while the nuts are discharged from the forward end of the riddle to the table 42. Upon this table, they may be inspected and any incompletely hulled nuts may be returned to the hopper and particles of hulls which may have passed to the table may be removed.

It will be obvious that with a construction of the character above described, the operation of removing the nuts from the hulls and other débris will be materially facilitated and the operation may be carried out in a very rapid manner. It will also be obvious that the construction hereinbefore set forth is capable of a certain range of change and modification without materially departing from the spirit of the invention and I accordingly do not limit myself to such specific structure except as hereinafter claimed.

I claim:—

1. In apparatus for removing hulls from nuts and the like, a body structure, a hopper mounted in one end of said body, lifting means carried by said hopper, a riddle mounted in said body and adapted to receive the nuts from said lift, hull removing means mounted in said body spaced downwardly from said riddle and adapted to receive the nuts from said riddle, a second riddle adapted to receive the nuts from said hull removing means, a movable table for receiving the nuts from the second riddle, and air blast means carried by the body for blowing the hull particles from the nuts dropping from said first riddle to said hull removing means.

2. In apparatus for removing hulls from nuts and the like, a body structure, a hopper mounted in one end of the body, lifting means carried by the hopper, a riddle mounted in said body and adapted to receive the nuts from the lift, hull removing means mounted in said hopper spaced downwardly from the riddle, the nuts dropping downwardly from said riddle to said hull removing means, a second riddle for receiving the nuts from the hull removing means, agitating means for said riddles, a movable picking table for receiving the nuts from the second riddle and blast means for blowing the hull particles from the nuts dropping from said first riddle to said hull removing means.

3. In apparatus for removing hulls from nuts and the like, a body structure, a hopper mounted in one end of said body, movable lifting means carried by said hopper, a riddle mounted in said body and adapted to receive the nuts from said lift, hull removing means mounted in said body spaced downwardly from the riddle, the nuts dropping downwardly from said riddle to said hull removing means, a second riddle adapted to receive the nuts from said hull removing means, link means connecting said first riddle with said second riddle, a movable table for receiving the nuts from the second riddle and blast means for blowing the hull particles from the nuts dropping from said first riddle to said hull removing means.

4. In apparatus for removing hulls from nuts and the like, a body structure, a hopper mounted in one end of said body, nut lifting means carried by said hopper, a riddle mounted in said body and adapted to receive the nuts from said lift, a baffle plate mounted in said body spaced downwardly from the riddle and adapted to receive the nuts from said riddle, hull removing means in said body and adapted to receive the nuts from said baffle plate, a second riddle in said body mounted in spaced relation to said hull removing means and receiving the nuts therefrom, and a movable picking table for receiving the nuts from the second riddle.

5. In apparatus for removing hulls from nuts and the like, a body structure, a hopper mounted in one end of the body, lifting means carried by said hopper, a hinged closure in said hopper for closing the lower end thereof and adapted to direct the nuts toward said lifting means, agitating means for receiving the nuts from said lift, hull removing means mounted in said body spaced downwardly from said agitating means, a second agitating means mounted in said body in spaced relation to said hull removing means and adapted for movement with said first agitating means said second agitating means receiving the nuts from said hull removing means, and a movable picking table adapted to receive the nuts from said second agitating means.

In testimony whereof I hereunto affix my signature.

ALBERT W. LA FORGE.